United States Patent [19] [11] 4,027,106
Belforte et al. [45] May 31, 1977

[54] INTERFACE UNIT FOR TDM SWITCHING COMPONENT OF PCM TELECOMMUNICATION SYSTEM

[75] Inventors: Piero Belforte; Giancarlo Guaschino; Giovanni Perucca, all of Turin, Italy

[73] Assignee: CSELT - Centro Studi e Laboratori Telecomunicazioni SpA, Turin, Italy

[22] Filed: Jan. 27, 1976

[21] Appl. No.: 652,870

[30] Foreign Application Priority Data

Jan. 28, 1975 Italy .................................. 67187/75

[52] U.S. Cl. ............................................ 179/15 AT
[51] Int. Cl.² ........................................... H04J 3/16
[58] Field of Search ................... 179/15 AT, 15 AQ

[56] References Cited

UNITED STATES PATENTS 3,878,338   4/1975   Hardy ........................... 179/15 AT
3,920,916   11/1975  Brightman et al. ............ 179/15 AL Primary Examiner—Thomas W. Brown
Attorney, Agent, or Firm—Karl F. Ross; Herbert Dubno

[57] ABSTRACT

A processor in a telephone exchange, monitoring the activity of $r$ subscriber lines having each an incoming and an outgoing channel allocated to them, emits during respective halves of any 8-bit time slot in a 32-time-slot frame a pair of $m$-bit addresses $x$, $y$ for each subscriber initiating or engaged in a conversation, these addresses respectively identifying an outgoing channel of a first (e.g. calling) subscriber and an incoming channel of a second (e.g. called) subscriber to be placed once per frame in communication with each other by a PCM switching network. The addresses of incoming and outgoing channels issuing from the processor during each time slot are separated in a distributor, the addresses $y$ being inscribed in stages of a storage network respectively assigned to the $32 \cdot 32 \cdot n$ channels identified by addresses $x$. The storage network consists of $n$ random-access memories, one for each of $n$ channel groups, divided into 32 sections of 32 stages each for as many 32-channel families. Each of 32 scanning intervals composed of $n$ phases, occurring within a time slot, is reserved for the successive readout of homothetic stages in a respective set of $n$ corresponding sections of all the memories, the set being divided into two subsets respectively scanned in the presence of relatively staggered enabling pulses also spanning $n$ phases each whereby the readout of each subset starts after the beginning and terminates before the end of the corresponding enabling pulse.

10 Claims, 7 Drawing Figures

INTERFACE UNIT FOR TDM SWITCHING COMPONENT OF PCM TELECOMMUNICATION SYSTEM

FIELD OF THE INVENTION

Our present invention relates to an interface unit for a time-division-multiplex (TDM) switching component of a pulse-code-modulation (PCM) telephone or other telecommunication system.

BACKGROUND OF THE INVENTION

A central office or exchange of a PCM/TDM telecommunication system generally comprises a processor which monitors the activities of the subscriber lines and allocates to each active subscriber, communicating therewith either directly or through a remote transit exchanger, both an incoming an outgoing PCM channel; a switching network then serves to transfer PCM-coded messages from one subscriber, arriving at the central office via the incoming channel allocated to that line, to the outgoing channel allocated to another subscriber called by (or calling) the first one, with interim storage of the message bits between time slots assigned to the two intercommunicating channels. The switching network must therefore receive from the processor, during a recurrent TDM frame composed of a multiplicity of time slots, the identification codes or addresses of all the allocated channels which are to be operatively coupled together in the course of such a frame.

Thus, an interface unit inserted between the processor and the switching network must register these address codes and feed them to the switching network at the proper instants in order to indicate the correlation among active channels. That information, of course, must be updated from one time slot to the next.

If the number of channels handled by the exchange is large, the interface unit must have a correspondingly high storage capacity; conventional memories capable of being read rapidly enough to supply all the requisite operating instructions to the switching network within the time available therefor, however, have only a limited capacity.

OBJECTS OF THE INVENTION

An important object of our invention, therefore, is to provide an improved interface unit for the purpose described which satisfies the mutually contradictory requirements of large storage capacity and high reading speed.

Another object is to provide a unit of this type which can be assembled at moderate cost from relatively inexpensive low-speed memories.

SUMMARY OF THE INVENTION

An interface unit according to our invention comprises a distributing network connected to the processor for receiving therefrom, during each time slot, the addresses of all incoming and outgoing channels allocated to respective subscriber lines, the unit being able to handle up to $r$ channel pairs corresponding to the maximum number of calls that can be accommodated at the same time. The addresses of all the allocated incoming channels and the addresses of all the allocated outgoing channels are sequentially read out, contemporaneously, via separate outputs which may each consist of a set of $m$ leads where $m$ is the number of bits in an address code. The addresses read out from one of these outputs, e.g. those relating to the incoming channels allocated by the processor, are then stored in a set of $n$ substantially identical transfer memories with $r/n$ stages each, $n$ being an integer greater than 1; each stage of each transfer memory, specifically an array of $m$ bit cells, is unequivocally indentifiable by the address — e.g. that of an outgoing channel — read out from the other output of the distributing network. Thus, with the aid of suitable writing means, the addresses of all incoming channels received from the processor during a given time slot are entered in memory stages identified by the companion addresses of outgoing channels, or vice versa; in a preferred system, both types of operation are preformed simultaneously in respective halves of the interface unit. Next, homothetic stages of all the $n$ transfer memories — i.e., those occupying corresponding positions therein — are sequentially scanned during each time slot, with the aid of reading means including $k$ generators of mutually staggered enabling pulses that serve to preselect certain stages of respective subsets of $n/k$ transfer memories to which these generators are connected in a writing mode; $k$ is an integer greater than 1 divisible into $n$, being equal to 2 in the embodiment described hereinafter and of course in the limiting case of $n = 2$. A multiplexer synchronized with the reading means establishes, within each time slot, a series of immediately consecutive scanning intervals during each of which all the transfer memories are successively connected to the switching network for transmitting thereto the contents of the preselected stages of each subset of $n/k$ memories in a time span which begins after the start and terminates before the end of the corresponding enabling pulse.

The latter feature, i.e. the delay of the readout of a memory stage beyond the start of an enabling pulse which conditions that stage for scanning, is particularly important since it avoids a period of uncertainty which follows the enablement of a memory stage. This delay, as will become more clearly apparent hereinafter, is made possible by the division of the set of transfer memories into at least two subsets to which the enabling pulses are fed at staggered times; still, the scanning intervals follow one another without pause so that homothetic stages of all transfer memories are read during $n$ consecutive phases constituting such a scanning interval.

Advantageously, each transfer memory is divided into $p$ sections of $q$ stages each, assigned to $p$ families of $q$ channels in a respective group (there being $n$ such groups in the system). With $p$ scanning intervals generated in each time slot, the scan progresses through all the $q$ stages of all memory sections in the course of a frame of $q$ time slots whereby one channel address from each family of each group is transmitted to the switching network in each time slot.

BRIEF DESCRIPTION OF THE DRAWING

The above and other features of our invention will now be described in detail with reference to the accompanying drawing in which.

SPECIFIC DESCRIPTION

Figure 1:
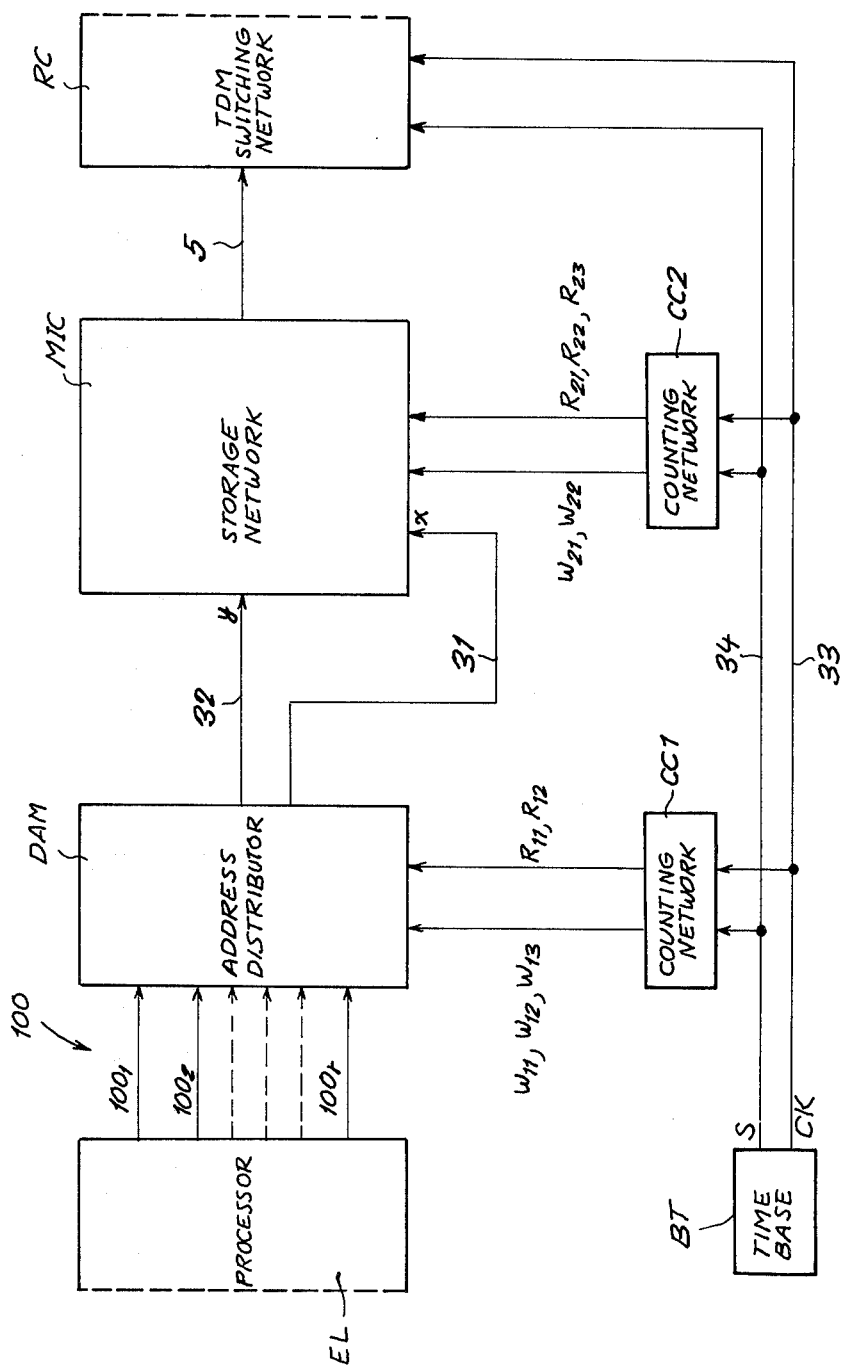
FIG. 1 is an overall block diagram of part of a central office of a TDM/PCM telephone system including an interface unit according to our present invention.

Reference will first be made to FIG. 1 which shows a TDM switching component of an otherwise conventional central office or exchange of a telephone system. The exchange is assumed to serve, at one time, up to $r = npq$ subscriber lines having each an incoming and an outgoing PCM channel allocated to it, the incoming as well as the outgoing channels being divided into $n$ groups of $p$ families of $q$ channels each. In the present instance it is assumed that $p = q$ 32.

Only one half of the switching stage shown in FIG. 1, relating to the connections established between the incoming channels of calling subscribers and the outgoing channels of called subscribers, will be described in detail with reference to subsequent Figures; and analogous circuit arrangement handles the connections established between the outgoing channels of calling subscribers and the incoming channels of called subscribers.

A conventional processor EL, not illustrated in detail, generates on a set of output multiples $100_1$, $100_2$, . . . $100_r$ (collectively designated 100) the addresses of outgoing and incoming channels allocated to any subscriber initiating or engaged in a conversation, these addresses being hereinafter designated $x$ and $y$, respectively. The multiples $100_1 - 100_r$ terminate at an address distributor DAM which is controlled by writing signals $W_{11}$, $W_{12}$, $W_{13}$ and reading signals $R_{11}$, $R_{12}$ from a counting network CC1, and reads out the outgoing and incoming addresses $x$ and $y$ on a pair of multiples 31, 32 to a storage network MIC comprising $n$ read/write memories. Network MIC is controlled by writing signals $W_{21}$, $W_{22}$ and reading signals $R_{21}$, $R_{22}$, $R_{23}$ from a counting network CC2. A conventional TDM switching network RC, not illustrated in detail, serves to establish the proper connections between intercommunicating incoming and outgoing channels under the control of address codes transmitted to it via an output multiple 5 of storage network MIC. A time base BT has output leads 33 and 34 delivering clock pulses CK and frame-synchronizing signals S to networks CC1, CC2 and RC.

Figure 2:
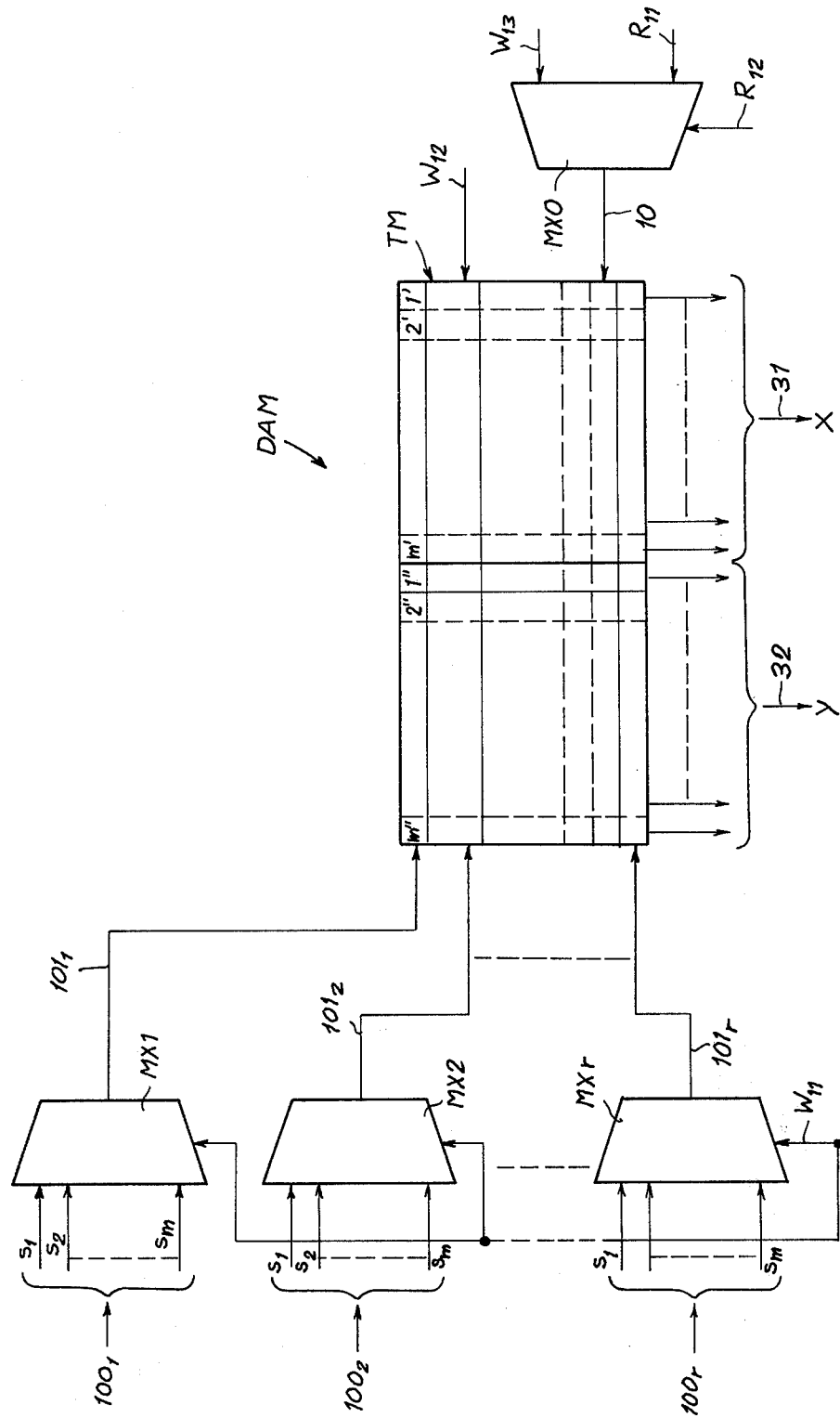
FIGS. 2–5 are more detailed circuit diagrams of various components of the interface unit of FIG. 1.

The address distributor DAM, more fully illustrated in FIG. 2, comprises a set of multiplexers MX1, MX2, . . . MX$r$ each provided with $m$ inputs $s_1, s_2, \ldots s_m$ which are tied to the leads of respective multiples $100_1$, $100_2$, . . . $100_r$ originating at the processor EL of FIG. 1. These multiplexers have control inputs connected in parallel to an output lead of counting network CC1 (FIG. 1) carrying the writing signal $W_{11}$, that signal consisting of a series of $m$ pulses (see FIG. 6) whereby the several inputs of all the multiplexers are sequentially scanned to energize respective output leads $101_1$, $101_2$, . . . $101_r$ terminating at a read/write buffer memory TM. This memory has an orthogonal matrix of bit cells organized in $r$ rows and $2m$ columns, the $m$ columns of the first memory half receiving the incoming addresses $y$ and the $m$ columns of the second memory half receiving the outgoing addresses $x$ including in the instructions appearing on the respective multiples $101_1 - 101_r$. The writing of the addresses in memory TM is controlled by signals $W_{12}$ and $W_{13}$, the latter passing through a multiplexer MXO having an output 10. Signal $R_{12}$, when present, switches the multiplexer MXO to a reading position in which signal $R_{11}$ appears on output 10 in lieu of signal $W_{13}$. In the reading mode, outgoing addresses $x$ and incoming addresses $y$ successively appear on the separate multiples 31 and 32 extending from memory TM to storage network MIC.

Figure 3:
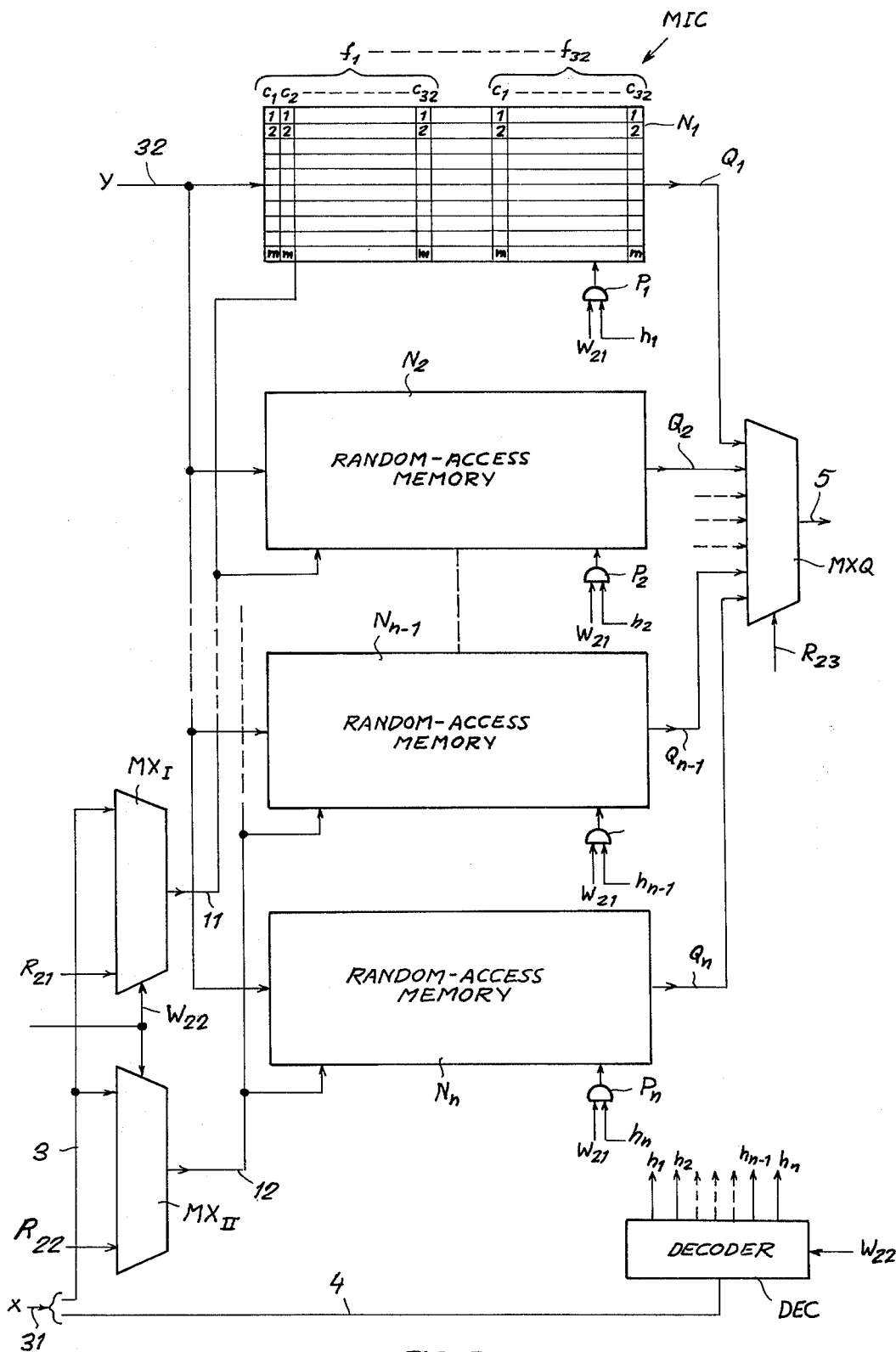

As shown in FIG. 3, network MIC comprises a multiplicity of transfer memories $N_1, N_2, \ldots N_{n-1}, N_n$ of the read/write, random-access type with $m$ rows and 1024 columns each, the columns constituting $m$-cell stages and being divided into 32 sections of 32 columns apiece corresponding to the 32 families $f_1 - f_{32}$ of 32 channels $c_1 - c_{32}$ each into which each group is divided. Multiple 32, carrying the addresses of incoming channels $y$, is connected in parallel to the loading inputs of all memories $N_1 - N_n$ whose output multiples $Q_1, Q_2$, . . . $Q_{n-1}, Q_n$ converge at a multiplexer MXQ feeding the multiple 5. Multiple 31 is split into two submultiples 3 and 4, the former carrying the channel and family identifications in parallel to a pair of multiplexers MX$_I$ and MX$_{II}$ whereas the latter delivers the group identifications to a decoder DEC with output leads $h_1, h_2, \ldots h_{n-1}, h_n$ terminating at respective AND gates $P_1, P_2, \ldots P_{n-1}, P_n$ which are connected to respective control inputs of memories $N_1 - N_n$. AND gates $P_1 - P_n$ also receive the writing signal $W_{21}$, writing signal $W_{22}$ being fed to switching inputs of multiplexers MX$_I$, MX$_{II}$ and an enabling input of decoder DEC. Multiplexers MX$_I$ and MX$_{II}$ have output multiples 11 and 12 which receive the address portion of submultiple 3 in a writing position and respective signals $R_{21}$, $R_{22}$ in a reading position (i.e. in the absence of signal $W_{22}$), signals $R_{21}$ and $R_{22}$ being relatively staggered as described hereafter with reference to FIGS. 6 and 7. Reading signal $R_{23}$ goes to a switching input of multiplexer MXQ.

Each output multiple 11 and 12 extends in parallel to control inputs of a respective set of $n/k$ transfer memories, i.e. the first $n/2$ memories of network MIC in the case of multiple 11 and the last $n/2$ memories of that network in the case of multiple 12. With large values of $n$ it may be necessary to have $k>2$, i.e. to provide more than two multiplexers serving respective subgroups, reading signals $R_{21}$ and $R_{22}$ being then supplemented by one or more similar signals in staggered relationship.

Figure 4:
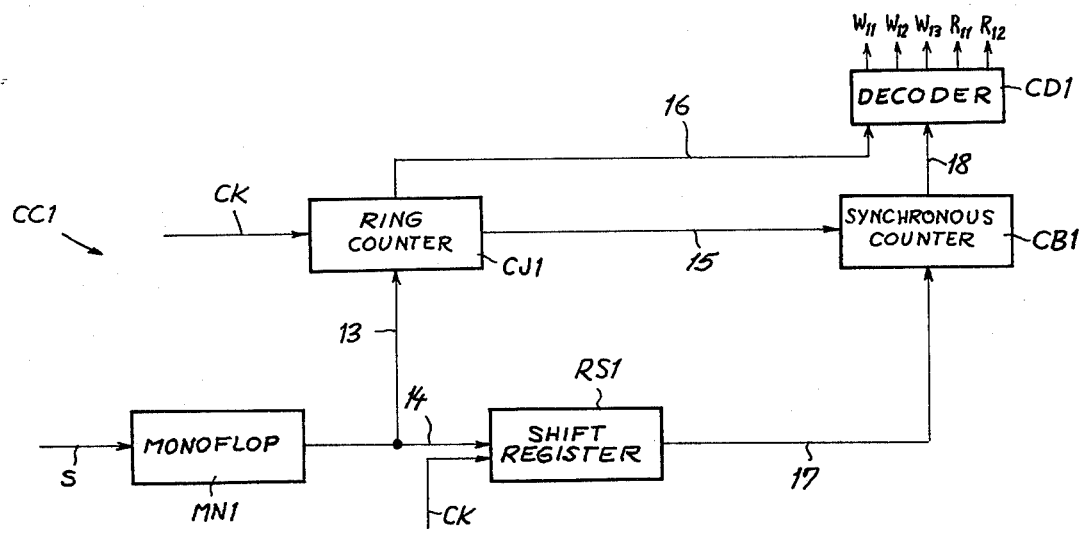
Figure 6:
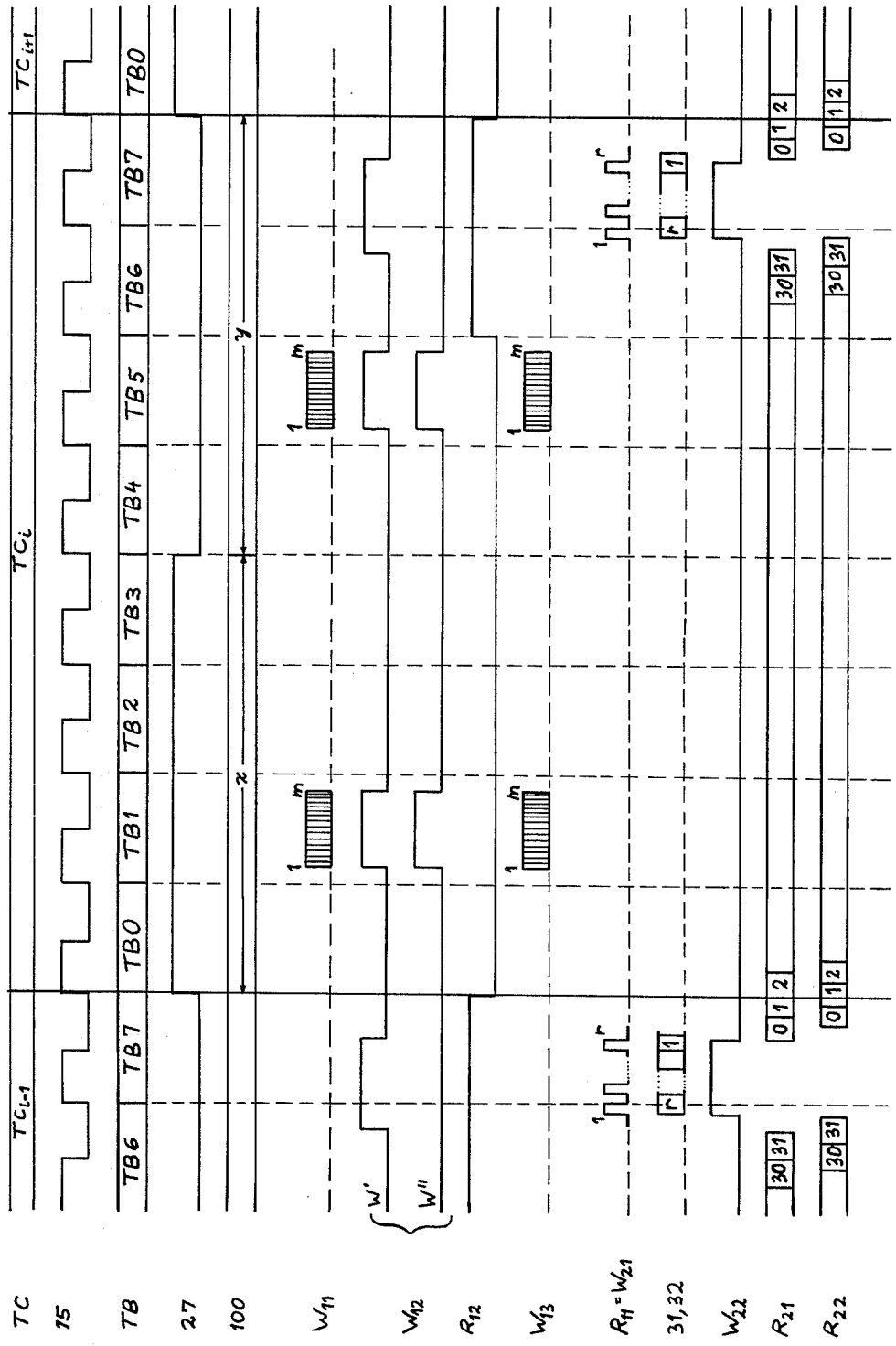
FIG. 6 is a set of graphs depicting certain signals generated in the central office during a time slot of the TDM system.
Figure 7:
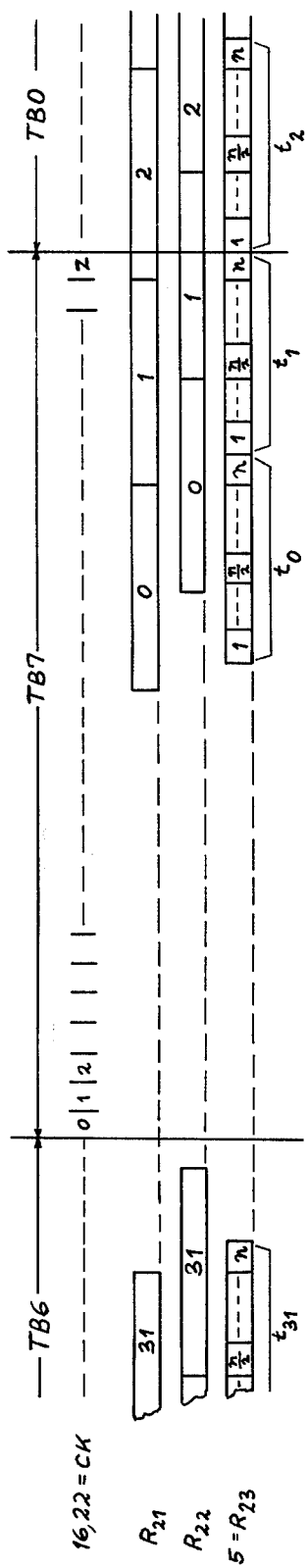
FIG. 7 is a similar set of graphs relating to signals generated during a bit period of a time slot.

Counting network CC1, more fully illustrated in FIG. 4, comprises a binary ring counter CJ1 whose last stage automatically feeds back the complement of its contents to its first stage, this counter being stepped by the clock pulses CK from time base BT (FIG. 1) and working into a decoder CD1 via an output multiple 16. Each time slot, indicated at TC in FIG. 6, is divided into eight bit periods TB0 – TB7, with $z$ clock pulses occurring within each bit period as shown in FIG. 7 for period TB7. Circuit CJ1 counts the number of clock pulses within each bit period, thus establishing $z$ phases with the length of a clock cycle whose code appears on multiple 16. An output lead 15 of this counter, energized by its last stage during the first half of each bit period, extends to a stepping input of a synchronous binary counter CB1 also working into decoder CD1 via an output multiple 18. A leading edge of synchronizing pulse S, occurring at the beginning of each frame composed of 32 time slots TC, trips a monoflop MN1 generating on a lead 13 a resetting pulse for counter CJ1, this resetting pulse being shorter than a clock pulse CK. A branch 14 of lead 13 extends to a shift register RS1 which is stepped by the clock pulses CK and acts as a delay network for resetting the counter CB1 via a lead 17, the delay being commensurate with the transit time of that resetting pulse through the counter CJ1. In response to the phase and bit counts on output multiples 16 and 18, decoder CD1 emits the aforementioned writing and reading signals $W_{11}$, $W_{12}$, $W_{13}$, $R_{11}$ and $R_{12}$. The number of phases $z$ per time slot depends on the number $r$ of channels as well as on the capacity and operating speed of switching network RC (FIG. 1).

Figure 5:
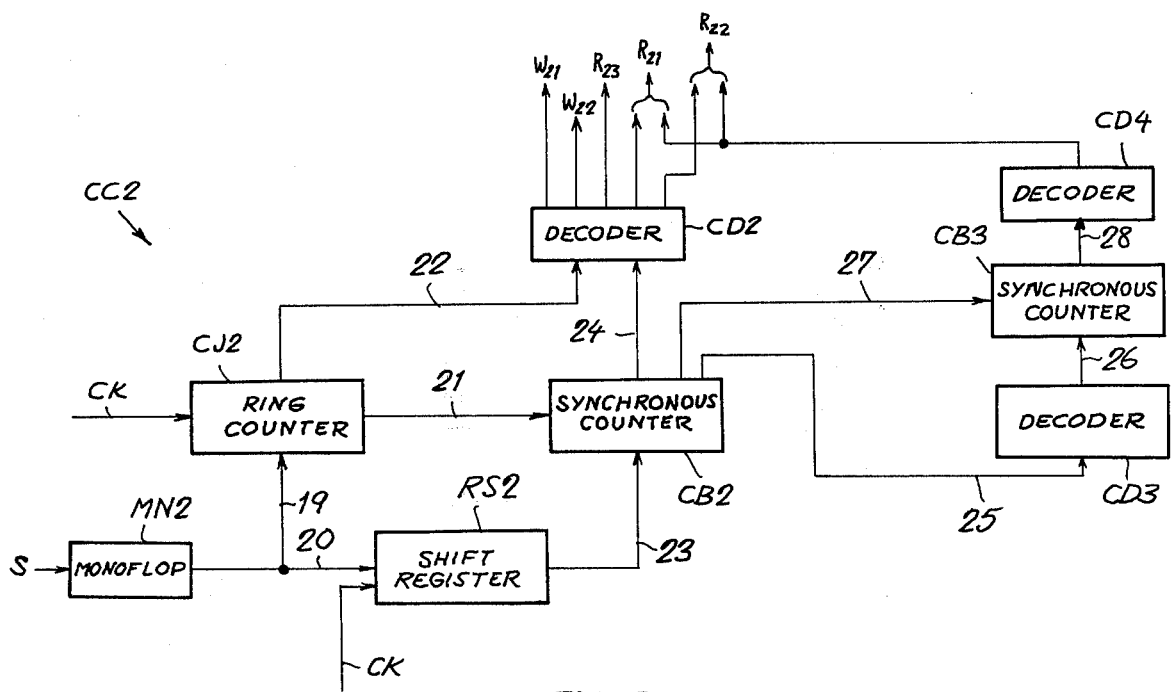

As illustrated in FIG. 5, the construction of counting network CC2 is similar to that of network CC1 in that it comprises a monoflop MN2, a shift register RS2, a ring counter CJ2, a synchronous counter CB2 and a decoder CD2 with intervening connections 19 – 24, their construction and mode of operation being analogous to those of units MN1, RS1, CJ1, CB1 and CD1, respectively. Counter CB2 has two further outputs 25 and 27 extending to a decoder CD3 and to another synchronous counter CB3, respectively, the latter counter being stepped once per time slot via connection 27 and being reset once per frame by a pulse on an output lead 26 of decoder CD3. Signals $W_{21}$, $W_{22}$ and $R_{23}$, occurring entirely within a time slot TC, are generated by decoder CD2. Signal $R_{21}$ and $R_{22}$, beginning in the last bit period TB7 of one time slot and ending in the penultimate bit period TB6 of the immediately following time slot as shown in FIG. 6, consist each of a sequence of 32 enabling pulses generated in part by the decoder CD2 and in part by an ancillary decoder CD4 in an output 28 of counter CB3 which is reset by the decoder CD3 in each bit period TB7.

In FIG. 6 we have shown a representative time slot $TC_i$ together with parts of the immediately preceding and following time slots $TC_{i-1}$, $TC_{i+1}$. The several graphs of this Figure represent (top to bottom) the output signal of counter CJ1 appearing on lead 15 (FIG. 4) and determining the start of each bit period, the four-bit intervals TB0 – TB3 and TB4 – TB7 reserved within each time slot for the reception of outgoing and incoming addresses $x$ and $y$ from processor EL via multiples 100 (FIG. 1), the writing signal $W_{11}$ generated in the second bit period of each of these intervals (i.e. during periods TB1 and TB5), the writing signal $W_{12}$ consisting of two pulse trains W' and W" (pulses W' and W" both spanning the pulse trains of signal $W_{11}$ whereas an additional pulse W' occurs in bit periods TB6 and TB7), reading signal $R_{12}$ which is present in bit periods TB6 and TB7, writing signal $W_{13}$ coinciding with signal $W_{11}$, coincident reading and writing signals $R_{11}$ and $W_{21}$ consisting each of a train of $r$ pulses in periods TB6 and TB7, the address codes ($r$ ... 1) read out on output multiples 31 and 32 of buffer memory TM (FIG. 2) in the same periods, the writing signal $W_{22}$ occurring during the readout interval, and the above-discussed reading signals $R_{21}$, $R_{22}$ whose constituent enabling pulses assume successive values from 0 through 31 to identify the several channel families $f_1 - f_{32}$ by activating the corresponding memory sections.

In FIG. 7, where the bit period TB7 has been indicated on a larger scale, we have shown the phase counts $0 \ldots z$ appearing on leads 16 and 22 in the rhythm of clock pulses CK, part of the reading signal $R_{21}$ and $R_{22}$, and the reading signal $R_{23}$ composed of the addresses $1 \ldots n$ of the memories $N_1 - N_n$ (FIG. 3) scanned in the course of an interval $t_0 \ldots t_{31}$ equal to the duration of a single enabling pulse $0 - 31$ of signals $R_{21}$ and $R_{22}$. Each address code of reading signal $R_{23}$ coincides with the readout, on the output multiple 5 of multiplexer MXQ, of an $m$-bit incoming-channel address stored in one of the stages $c_1 - c_{32}$ of the memory section assigned to the corresponding family $f_1 - f_{32}$ of outgoing channels, the stages of each family being successively scanned in the 32 time slots of a frame. Thus, switching network RC receiving $32n$ addresses per time slot, the network being therefore able to establish $32n$ connections during as many clock cycles or phases within each time slot TC of the interface unit.

OPERATION

Processor EL, in monitoring the activity of the various subscriber lines served by the exchange either directly or through a remote central office, energizes one of its output multiples 100 whenever the corresponding subscriber initiates the establishment of a connection, thus at random times not synchronized with the operation of the central-office equipment downstream of that processor. The initiation of a connection or call involves the identification (e.g. by usual dialing process) of a called subscriber with whom the calling subscriber wishes to communicate, the processor thereupon allocating an incoming and outgoing channel to each of these two subscribers. Thus, if the line of the calling subscriber is linked to output multiple 101, there will appear on this multiple the $m$ bits of the address $x$ of the outgoing channel of the called subscriber in the first half of each time slot until the call is terminated or aborted, the $m$ bits of the address of the incoming channel of the calling subscriber appearing on the same multiple in the second half of each of these time slots. Another output multiple (not shown) of processor EL, paired with multiple 101, simultaneously delivers analogous addresses of the outgoing channel of the calling subscriber and the incoming channel of the called subscriber to a duplicate of network DAM.

The bits of address $x$ now appearing on inputs $s_1 - s_m$ of multiplexer MX1 (FIG. 2) are consecutively sampled, during bit period TB1 of time slot $TC_i$, by the writing signal $W_{11}$ for serial readout on lead $101_i$; the same writing signal concurrently switches the other multiplexers to serialize the corresponding address codes, if any, fed to them by the processor. This procedure is repeated in bit period TB5 fo the bits of address $y$ whereby bits $1', 2', \ldots m'$ of address $x$ and $1', 2'', \ldots m''$ of address $y$ are entered in the top row of buffer memory TM, in reverse order, with address $x$ occupying the right-hand half and address $y$ occupying the left-hand half of that memory. The horizontal shifting of the bits in any of the $r$ rows of memory TM is commanded by the writing signal $W_{12}$ whose components W' and W" are both in existence during the bit periods TB1 and TB5, as will be apparent from FIG. 6; writing signal $W_{13}$, passing at the same time through multiplexer MX0 to the stepping input 10 of the memory, determines the rhythm of the shift. Signal $W_{13}$, like signal $W_{11}$, is a train of $m$ pulses in each bit period TB1, TB5.

Toward the end of bit periods TB6, signal W' recurs unaccompanied by signal W". This switches the logic circuits of memory TM for a vertical shifting of the stored bits in the rhythm of reading signal $R_{11}$ which passes through the multiplexer MX0 in the presence of signal $R_{12}$ and constitutes a train of $r$ pulses whereby the contents of each column of memory TM are serially read out to one of the leads of output multiple 31 in the case of addresses $x$ of the output multiple 32 in the case of addresses $y$. The bits of each of these addresses, therefore, now appear in parallel on the corresponding output multiple for separate transmission to storage network MIC (FIG. 3). Submultiple 2, carrying the address bits which identify one of the 32 families $f_1 - f_{32}$ in all memories $N_1 - N_n$ together with the position of the desired channel $c_1 - c_{32}$ within that family, is connected at this time via multiplexers $MX_I$ and $MX_{II}$ to multiples 11 and 12 in view of the presence of writing signal $W_{22}$ in the switching inputs of these multiplexers. Submultiple 4, at the same time, carries the group designation identifying one of the several memories of network MIC by energizing one of the input leads $h_1 - h_n$ of decoder DEC, thereby unblocking the corresponding AND gate $P_1 - P_n$ for the passage of writing signal $W_{21}$ which is identical with reading signal $R_{11}$. Each pulse of signal $W_{21}$, therefore, reaches the control input of a particular transfer memory to condition it for inscription of the address code $y$, then appearing on multiple 32, in the stage of that memory identified by the family and channel code on submultiple 3. Thus, if address $x$ designates the first one of the $1024n$ outgoing channels handled by network MIC, the message portion on submultiple 3 identifies stage $c_1$ of the first section $f_1$ of all the transfer memories while the message portion on submultiple 4 singles out the first memory $N_1$. As each pulse of writing signal $W_{21}$ coincides with a different pair of addresses on multiples 31 and 32, received in inverse order from multiplexers MX1 – MX$r$, all the information present on the output multiples 100 of processor EL during any time slot TC is stored in network MIC at the end of that time slot.

Immediately after the completion of this loading operation, which updates the contents of network MIC, signals $R_{21}$ and $R_{22}$ are passed by multiplexers $MX_I$ and $MX_{II}$ to multiples 11 and 12, respectively. The 32 enabling pulses constituting each of these signals preselect, successively, the several sections $f_1 \ldots f_{32}$ of each transfer memory as well as a particular stage $c_1 \ldots c_{32}$, changing from one time slot to the next, within each section. Signal $R_{22}$ lags the signal $R_{21}$ by about half a pulse width. Signal $R_{23}$ starts a little later than signal $R_{21}$ but earlier than signal $R_{22}$ to generate an unbroken series of 32 scanning intervals $t_0 \ldots t_{31}$ extending over $n$ phases each, this corresponding to the length of each enabling pulse of signals $R_{21}$ and $R_{22}$. The first half of each scanning interval, covering a time span of $n/2$ phases, follows the beginning of each enabling pulse of signal $R_{21}$ with a sufficient delay to allow proper conditioning of the preselected stage of the first memory $N_1$ of the corresponding subset for readout before the output multiple $Q_1$ of that memory is switched to multiple 5 by multiplexer MXQ under the control of signal $R_{23}$. In an analogous manner, the second half of each scanning interval — beginning with the $(n/2 + 1)^{th}$ code combination of signal $R_{23}$ — occurs some time after a stage of the first memory of the second subset has been preselected by an enabling pulse of signal $R_{22}$ to avoid a period of uncertainty during which the contents of that stage might be read out incorrectly.

It will be apparent that for $k = 3$, i.e. with division of transfer memories $N_1 - N_n$ into three subsets, the corresponding enabling-pulse sequences would have to be relatively offset by about a third of a pulse width, and so on.

We claim:

1. In an exchange of a telecommunication system serving a multiplicity of subscriber lines, including a processor for allocating to any active subscriber line an incoming and an outgoing PCM channel, a switching network for operatively coupling the incoming and outgoing channels of one subscriber line to the outgoing and incoming channels, respectively, of another subscriber line during corresponding time slots of a recurrent TDM frame, and an interface unit inserted between said processor and said switching network, the improvement wherein said interface unit comprises:

distributing means connected to said processor for receiving therefrom, during each time slot, the addresses of all allocated incoming and outgoing channels forming up to $r$ channel pairs, said distributing means having a first output for sequentially reading out the addresses of all allocated incoming channels and a second output for sequentially reading out the addresses of all allocated outgoing channels during each time slot;

a set of $n$ substantially identical transfer memories with $r/n$ stages each for the storage of respective channel addresses read out during one time slot from one of said outputs, each stage being unequivocally identifiable by a channel address read out from the other of said outputs, $n$ being an integer greater than 1;

writing means for entering, during each time slot, all the channel addresses read out from said one of said outputs in the stages identified by the channel addresses concurrently read out from the other of said outputs;

reading means for sequentially scanning the stages of each transfer memory during successive time slots, the stages scanned during any time slot occupying homothetic positions in said transfer memories, said reading means including $k$ generating of mutually staggered enabling pulses each connected to a respective subset of $n/k$ transfer memories for preselecting certain stages thereof, $k$ being an integer greater than 1 divisible into $n$; and multiplexing means synchronized with said reading means for establishing within each time slot a series of immediately consecutive scanning intervals during each of which all said transfer memories are successively connected to said switching network for transmitting thereto the contents of the preselected stages of each subset of $n/k$ transfer memories in a time span beginning after the start and terminating before the end of the corresponding enabling pulse.

2. The improvement defined in claim 1 wherein each channel address is divided into a first portion and a second portion, said first portion identifying one of $p$ families of $q$ channels each in any of $n$ groups of families respectively assigned to said transfer memories, each of said transfer memories being divided into $p$ memory sections alloted to the families of the respective group, each memory section being composed of $q$ stages, said writing means comprising a first and a second circuit connected to said other of said outputs for respectively receiving therefrom said first and second portions of each channel address read out therefrom, said first circuit extending to all said transfer memories in parallel for simultaneously conditioning homothetic sections and channels thereof to receive a channel address read out from said one of said outputs, said second circuit including decoding means for selecting a single transfer memory to receive the last-mentioned channel address.

3. The improvement defined in claim 2 wherein $p = q$ 32.

4. The improvement defined in claim 2 wherein the number of scanning intervals in each time slot equals $p$, each of said generators emitting $p$ enabling pulses per time slot for successively selecting one stage from each memory section and progressing through all the $q$ stages of all memory sections in the course of a frame consisting of $q$ time slots.

5. The improvement defined in claim 4 wherein $k = 2$, the enabling pulses from said generators being relatively staggered by substantially half a pulse width.

6. The improvement defined in claim 2 wherein said first circuit includes $k$ switches respectively connected to said subsets for transmitting thereto said first portion of each channel address in a writing mode and for connecting each subset to one of said generators in a scanning mode.

7. The improvement defined in claim 1 wherein each channel address consists of $m$ bits received in parallel from said processor, each of said outputs consisting of $m$ leads, said distributing means comprising a buffer memory with a matrix of bit cells divided into $r$ rows and $2m$ columns for serially receiving the address bits of two intercommunicating channels in each row and for the parallel readout of the address bits of incoming channels from $m$ columns via the leads of said first output and the address bits of outgoing channels from $m$ other columns via the leads of said second output.

8. The improvement defined in claim 7 wherein said processor is provided with $r$ output multiples of $m$ leads each, further comprising an $m$-position multiplexer inserted between each of said output multiples and a respective row input of said buffer memory.

9. The improvement defined in claim 1, further comprising a timing circuit for controlling the operation of said writing, reading and multiplexing means, said timing circuit including counting means for dividing each time slot into a multiplicity of phases, said multiplexing means being steppable by said counting means to connect homothetic stages of all transfer memories to said switching network during $n$ consecutive phases constituting a scanning interval.

10. The improvement defined in claim 9 wherein said timing circuit includes a source of synchronizing pulses for resetting said counting means at the beginning of each frame.

* * * * *